United States Patent
Zhamu et al.

(10) Patent No.: US 9,422,164 B2
(45) Date of Patent: *Aug. 23, 2016

(54) ELECTROCHEMICAL METHOD OF PRODUCING NANO GRAPHENE PLATELETS

(71) Applicants: Aruna Zhamu, Centerville, OH (US); Bor Z Jang, Centerville, OH (US)

(72) Inventors: Aruna Zhamu, Centerville, OH (US); Bor Z Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/987,362

(22) Filed: Jul. 17, 2013

(65) Prior Publication Data

US 2015/0021196 A1    Jan. 22, 2015

(51) Int. Cl.
*C25B 1/00* (2006.01)
*C01B 31/04* (2006.01)
*C01B 31/02* (2006.01)
*B82Y 40/00* (2011.01)

(52) U.S. Cl.
CPC .......... *C01B 31/0446* (2013.01); *C01B 31/0206* (2013.01); *C01B 31/0415* (2013.01); *C01B 31/0423* (2013.01); *B82Y 40/00* (2013.01); *Y10S 977/842* (2013.01)

(58) Field of Classification Search
CPC ...... C25B 1/00; C01B 31/04; C01B 31/0415; C01B 31/0423
USPC .......................................................... 205/555
See application file for complete search history.

(56) References Cited

U.S. PATENT DOCUMENTS

| | | | |
|---|---|---|---|
| 3,434,917 A | 3/1969 | Kraus et al. | |
| 3,885,007 A | 5/1975 | Olsen et al. | |
| 4,091,083 A | 5/1978 | Hirschvogel et al. | |
| 4,244,934 A | 1/1981 | Kondo et al. | |
| 4,350,576 A | 9/1982 | Watanabe et al. | |
| 4,895,713 A | 1/1990 | Greinke et al. | |
| 5,503,717 A | 4/1996 | Kang et al. | |
| 5,698,088 A * | 12/1997 | Kang et al. | 205/555 |

(Continued)

OTHER PUBLICATIONS

Viculis et al.,"Intercalation and Exfoliation Routes to Graphite Nanoplatelets", J. Mater. Chem. (no month, 2005), vol. 15, pp. 974-978.*

(Continued)

*Primary Examiner* — Edna Wong

(57) ABSTRACT

A method of producing nano-scaled graphene platelets with an average thickness smaller than 30 nm from a layered graphite material. The method comprises (a) forming a carboxylic acid-intercalated graphite compound by an electrochemical reaction; (b) exposing the intercalated graphite compound to a thermal shock to produce exfoliated graphite; and (c) subjecting the exfoliated graphite to a mechanical shearing treatment to produce the nano-scaled graphene platelets. Preferred carboxylic acids are formic acid and acetic acid. The exfoliation step in the instant invention does not involve the evolution of undesirable species, such as $NO_x$ and $SO_x$, which are common by-products of exfoliating conventional sulfuric or nitric acid-intercalated graphite compounds. The nano-scaled platelets are candidate reinforcement fillers for polymer nanocomposites. Nano-scaled graphene platelets are much lower-cost alternatives to carbon nano-tubes or carbon nano-fibers.

8 Claims, 5 Drawing Sheets

(56) References Cited

U.S. PATENT DOCUMENTS

| | | | |
|---|---|---|---|
| 6,287,694 B1* | 9/2001 | Zaleski et al. | 428/402 |
| 6,406,612 B1* | 6/2002 | Greinke | 205/555 |
| 6,416,815 B2 | 7/2002 | Greinke | |
| 6,669,919 B1 | 12/2003 | Greinke | |
| 6,872,330 B2 | 3/2005 | Mack et al. | |
| 8,132,746 B2* | 3/2012 | Zhamu et al. | 241/1 |
| 8,524,067 B2* | 9/2013 | Zhamu | B82Y 30/00 205/555 |
| 2004/0127621 A1* | 7/2004 | Drzal | C08K 3/04 524/424 |

OTHER PUBLICATIONS

Yasmin et al., "Processing of Expanded Graphite Reinforced Polymer Nanocomposites," Composites Science and Technology (no month, 2006), vol. 66, pp. 1182-1189.*

Viculis et al., "Intercalation and Exfoliation Routes to Graphite Nanoplatelets", J. Mater. Chem. (no month, 2005), vol. 15, pp. 974-978.*

Yu et al., "Graphite Nanoplatelet-Epoxy Composite Thermal Interface Materials," The Journal of Physical Chemistry C Letters (no month, 2007), vol. 111, No. 21, pp. 7565-7569.*

Scharff, "Electrochemical Investigations on Graphite Salts with Nitric Acid, Perchloric Acid, Rhenic Acid (HReO4), and Halogenated Acetic Acids," Zeitschrift fuer Naturforschung, B: Chemical Sciences (no month, 1989), vol. 44, No. 7, pp. 772-777.*

Fukushima et al., "A Carbon Nanotube Alternative: Graphite Nanoplatelets as Reinforcements for Polymers," Annual Technical Conference—Society of Plastics Engineers (no month, 2003), 61st (vol. 2), pp. 2230-2234.*

U.S. Appl. No. 11/509,424, filed Aug. 25, 2006, B. Z. Jang, et al.
U.S. Appl. No. 11/526,489, filed Sep. 26, 2006, B. Z. Jang, et al.
U.S. Appl. No. 11/709,274, filed Feb. 22, 2007, B. Z. Jang, et al.
U.S. Appl. No. 11/787,442, filed Apr. 17, 2007, A. Zhamu, et al.
U.S. Appl. No. 11/800,728, filed May 8, 2007, A. Zhamu, et al.
U.S. Appl. No. 11/879,680, filed Jul. 17, 2007, A. Zhamu, et al.
L. M. Viculis and J. J. Mack, et al., "Intercalation and Exfoliation Routes to Graphite Nanoplatelet," J. Mater. Chem., 15 (2005) pp. 974-978.

* cited by examiner

---------- 100 nm

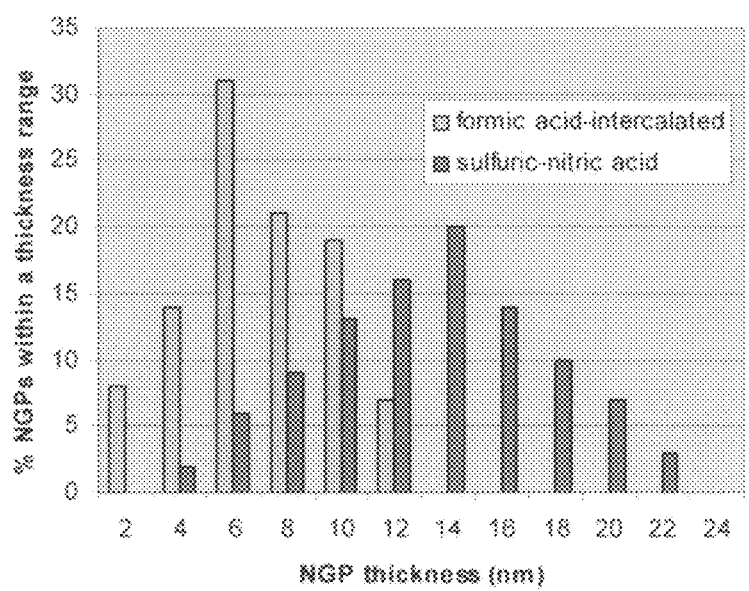

ELECTROCHEMICAL METHOD OF PRODUCING NANO GRAPHENE PLATELETS

This is a divisional of U.S. patent application Ser. No. 11/881,388 (Jul. 27, 2007), now U.S. Pat. No. 8,524,067.

FIELD OF THE INVENTION

The present invention relates to a method of producing nano-scaled graphene platelets (NGPs) or graphite nano-platelets. The method comprises a step of electrochemically intercalating a layered graphite material, such as natural graphite, graphite oxide, and other laminar graphite compounds, to produce a graphite intercalation compound (GIC). This step is followed by exfoliation of the GIC and separation of the exfoliated graphite flakes to form NGPs, particularly NGPs with an average thickness of no more than 2 nm or 5 layers (i.e., 5 graphene sheets or 5 layers of basal plane).

BACKGROUND

Carbon is known to have four unique crystalline structures, including diamond, graphite, fullerene and carbon nano-tubes. The carbon nano-tube (CNT) refers to a tubular structure grown with a single wall or multi-wall, which can be conceptually obtained by rolling up a graphene sheet or several graphene sheets to form a concentric hollow structure. A graphene sheet is composed of carbon atoms occupying a two-dimensional hexagonal lattice. Carbon nano-tubes have a diameter on the order of a few nanometers to a few hundred nanometers. Carbon nano-tubes can function as either a conductor or a semiconductor, depending on the rolled shape and the diameter of the tubes. Its longitudinal, hollow structure imparts unique mechanical, electrical and chemical properties to the material. Carbon nano-tubes are believed to have great potential for use in field emission devices, hydrogen fuel storage, rechargeable battery electrodes, and as composite reinforcements.

However, CNTs are extremely expensive due to the low yield and low production rates commonly associated with all of the current CNT preparation processes. The high material costs have significantly hindered the widespread application of CNTs. Rather than trying to discover much lower-cost processes for nano-tubes, we have worked diligently to develop alternative nano-scaled carbon materials that exhibit comparable properties, but can be produced in larger quantities and at much lower costs. This development work has led to the discovery of processes for producing individual nano-scaled graphite planes (individual graphene sheets) and stacks of multiple nano-scaled graphene sheets, which are collectively called nano-scaled graphene plates (NGPs). NGPs could provide unique opportunities for solid state scientists to study the structures and properties of nano carbon materials. The structures of these materials may be best visualized by making a longitudinal scission on the single-wall or multi-wall of a nano-tube along its tube axis direction and then flattening up the resulting sheet or plate. Studies on the structure-property relationship in isolated NGPs could provide insight into the properties of a fullerene structure or nano-tube. Furthermore, these nano materials could potentially become cost-effective substitutes for carbon nano-tubes or other types of nano-rods for various scientific and engineering applications. The electronic, thermal and mechanical properties of NGP materials are expected to be comparable to those of carbon nano-tubes; but NGP will be available at much lower costs and in larger quantities.

Direct synthesis of the NGP material had not been possible, although the material had been conceptually conceived and theoretically predicted to be capable of exhibiting many novel and useful properties. Jang and Huang have provided an indirect synthesis approach for preparing NGPs and related materials [B. Z. Jang and W. C. Huang, "Nano-scaled Graphene Plates," U.S. Pat. No. 7,071,258 (Jul. 4, 2006)]. In most of the prior art methods for making separated graphene platelets, the process begins with intercalating lamellar graphite flake particles with an expandable intercalation agent (also known as an intercalant or intercalate) to form a graphite intercalation compound (GIC), typically using a chemical oxidation [e.g., Refs. 1-5, listed below] or an electrochemical (or electrolytic) method [e.g., Refs. 6, 7, 17-20]. The GIC is characterized as having intercalate species, such as sulfuric acid and nitric acid, residing in interlayer spaces, also referred to as interstitial galleries or interstices. In traditional GICs, the intercalant species may form a complete or partial layer in an interlayer space or gallery. If there always exists one graphene layer between two intercalant layers, the resulting graphite is referred to as a Stage-1 GIC. If n graphene layers exist between two intercalant layers, we have a Stage-n GIC.) This intercalation step is followed by rapidly exposing the GIC to a high temperature, typically between 800 and 1,100° C., to exfoliate the graphite flakes, forming vermicular graphite structures known as graphite worms. Exfoliation is believed to be caused by the interlayer volatile gases, created by the thermal decomposition or phase transition of the intercalate, which induce high gas pressures inside the interstices that push apart neighboring graphene layers or basal planes. In some methods, the exfoliated graphite (worms) is then subjected to air milling, air jet milling, ball milling, or ultrasonication for further flake separation and size reduction. Conventional intercalation and exfoliation methods and recent attempts to produce exfoliated products or separated platelets are discussed in the following representative references:

1. J. W. Kraus, et al., "Preparation of Vermiculite Paper," U.S. Pat. No. 3,434,917 (Mar. 25, 1969).
2. L. C. Olsen, et al., "Process for Expanding Pyrolytic Graphite," U.S. Pat. No. 3,885,007 (May 20, 1975).
3. A. Hirschvogel, et al., "Method for the Production of Graphite-Hydrogensulfate," U.S. Pat. No. 4,091,083 (May 23, 1978).
4. T. Kondo, et al., "Process for Producing Flexible Graphite Product," U.S. Pat. No. 4,244,934 (Jan. 13, 1981).
5. R. A. Greinke, et al., "Intercalation of Graphite," U.S. Pat. No. 4,895,713 (Jan. 23, 1990).
6. F. Kang, "Method of Manufacturing Flexible Graphite," U.S. Pat. No. 5,503,717 (Apr. 2, 1996).
7. F. Kang, "Formic Acid-Graphite Intercalation Compound," U.S. Pat. No. 5,698,088 (Dec. 16, 1997).
8. P. L. Zaleski, et al. "Method for Expanding Lamellar Forms of Graphite and Resultant Product," U.S. Pat. No. 6,287,694 (Sep. 11, 2001).
9. J. J. Mack, et al., "Chemical Manufacture of Nanostructured Materials," U.S. Pat. No. 6,872,330 (Mar. 29, 2005).
10. L. M. Viculis and J. J. Mack, et al., "Intercalation and Exfoliation Routes to Graphite Nanoplatelet," J. Mater. Chem., 15 (2005) pp. 974-978.
11. Bor Z. Jang, Aruna Zhamu, and Jiusheng Guo, "Process for Producing Nano-scaled Platelets and Nanocomposites," U.S. patent Pending, Ser. No. 11/509,424 (Aug. 25, 2006).
12. Bor Z. Jang, Aruna Zhamu, and Jiusheng Guo, "Mass Production of Nano-scaled Platelets and Products," U.S. patent Pending, Ser. No. 11/526,489 (Sep. 26, 2006).

13. Bor Z. Jang, Aruna Zhamu, and Jiusheng Guo, "Method of Producing Nano-scaled Graphene and Inorganic Platelets and Their Nanocomposites," U.S. patent Pending, Ser. No. 11/709,274 (Feb. 22, 2007).
14. Aruna Zhamu, JinJun Shi, Jiusheng Guo, and Bor Z. Jang, "Low-Temperature Method of Producing Nano-scaled Graphene Platelets and Their Nanocomposites," U.S. patent Pending, Ser. No. 11/787,442 (Apr. 17, 2007).
15. Aruna Zhamu, Jinjun Shi, Jiusheng Guo and Bor Z. Jang, "Method of Producing Exfoliated Graphite, Flexible Graphite, and Nano-Scaled Graphene Plates," U.S. Patent Pending, Ser. No. 11/800,728 (May 8, 2007).
16. Aruna Zhamu, Joan Jang, Jinjun Shi, and Bor Z. Jang, "Method of Producing Ultra-thin, Nano-Scaled Graphene Plates," U.S. patent application Ser. No. 11/879,680 (Jul. 21, 2007).
17. N. Watanabe, et al., "Method of Producing a Graphite Intercalation Compound," U.S. Pat. No. 4,350,576 (Sep. 21, 1982).
18. R. A. Greinke, "Expandable Graphite and Method," U.S. Pat. No. 6,406,612 (Jun. 18, 2002).
19. R. A. Greinke and R. A. Reynolds, "Expandable Graphite and Method," U.S. Pat. No. 6,416,815 (Jun. 18, 2002).
20. R. A. Greinke, "Intercalated Graphite Flakes Exhibiting Improved Expansion Characteristics and Process Therefor," U.S. Pat. No. 6,669,919 (Dec. 30, 2003).

However, these previously invented methods [Refs. 1-10, 17-20] have several serious drawbacks:

(a) As indicated earlier, in conventional methods, graphite flakes are intercalated by dispersing the flakes in a solution containing a mixture of nitric and sulfuric acid. The intercalation solution may contain other acidic compounds such as potassium chlorate, chromic acid, potassium permanganate, potassium chromate, potassium dichromate, perchloric acid, and the like, or mixtures, such as for example, concentrated nitric acid and chlorate, chromic acid and phosphoric acid, or mixtures of a strong organic acid, e.g., trifluoroacetic acid. After the flakes are intercalated, any excess solution is drained from the flakes and the flakes are water-washed. The resulting waste water has to be properly treated (e.g., neutralized) prior to discharge into the sewage system. Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalate species retained by the flakes decompose to produce various species of sulfuric and nitrous compounds (e.g., $NO_x$ and $SO_x$), which are undesirable. The effluents require expensive remediation procedures in order not to have an adverse environmental impact.

(b) Typically, exfoliation of the intercalated graphite occurred at a temperature in the range of 800° C. to 1,100° C. At such a high temperature, graphite could undergo severe oxidation, resulting in the formation of graphite oxide, which has much lower electrical and thermal conductivities compared with un-oxidized graphite. In recent studies, we have surprisingly observed that the differences in electrical conductivity between oxidized and non-oxidized graphite could be as high as several orders of magnitude.

(c) The approach proposed by Mack, et al. [e.g., Refs. 9 and 10] is a low temperature process. However, Mack's process involves intercalating graphite with potassium melt, which must be carefully conducted in a vacuum or an extremely dry glove box environment since pure alkali metals, such as potassium and sodium, are extremely sensitive to moisture and pose an explosion danger. This process is not amenable to mass production of nano-scaled platelets.

(d) Most of the prior art intercalation/exfoliation approaches were developed for the purpose of producing graphite worms that are re-compressed to form flexible graphite sheet products. This purpose is perceived to require maximizing the exfoliation volume of a graphite sample. Non judicious practice of maximizing the expansion volume often occurred at the expense of reduced uniformity in exfoliation, i.e., certain portion of a graphite particle being exfoliated to a great extent, but other portions remaining intact. Graphite worms of this nature are not the most suitable for the production of separated, nano-scaled graphene platelets.

(e) Although prior art intercalation-exfoliation methods might be capable of sporadically producing a small amount of ultra-thin graphene platelets (e.g., 1-5 layers), most of the platelets produced are much thicker than 10 nm. Many of the NGP applications require the NGPs to be as thin as possible; e.g., as a supercapacitor electrode material. Hence, it is desirable to have a method that is capable of consistently producing ultra-thin NGPs.

Hence, an urgent need exists to have environmentally benign intercalates that do not lead to the effluent of undesirable chemical species into the drainage (e.g., sulfuric acid) or into the air (e.g., $SO_2$ and $NO_2$). It is further desirable to have a graphite intercalation compound that does not require a high exfoliation temperature. It is also desirable to have a GIC that can be more uniformly exfoliated for the production of nano-scaled graphene platelets that are more uniform in sizes. It is highly desirable to have a method of expanding a laminar (layered) compound or element, such as graphite and graphite oxide (partially oxidized graphite), to produce ultra-thin graphite and graphite oxide flakes or platelets, with an average thickness smaller than 2 nm or thinner than 5 layers. Most preferably, the method of intercalation and exfoliation should be applicable to not only natural flake graphite, but also synthetic graphite, highly oriented pyrolytic graphite, graphite oxide, graphite fiber, graphitic nano-fiber, and the like.

In order to meet these goals, we investigated potentially viable intercalates that contain no undesirable elements, such as N, S, P, As, Se, transition metal, or halogen element. In particular, we focused our studies on chemical species that contain only H, C, and O atoms, which are expected to produce no contaminants. We have found that carboxylic acids, such as formic, acetic, propionic, butyric, pentanoic, and hexanoic acids and their anhydrides, are particularly suitable for meeting our objectives.

It may be noted that Kang, et al [Ref. 7] used an electrochemical method to intercalate natural flake graphite with formic acid for the purpose of producing flexible graphite products. However, there was no indication that the formic acid-intercalated graphite could lead to well-separated, nano-scaled graphene platelets (NGPs), let alone NGPs of uniform sizes or ultra-thinness (e.g., thinner than 2 nm). Furthermore, there was no indication, implicit or explicit, that any other member of the carboxylic acid series or any member of their anhydrides and their derivatives could be successfully intercalated into interstices of graphite. There was also no indication that any of the carboxylic acid can be intercalated into other layered graphite structures (e.g., graphite fibers) than natural flake graphite. Further, although Greinke, et al [Ref. 18-20] used carboxylic acids as an "expansion aid" in the formation of expandable graphite (GICs) for the purpose of producing flexible graphite products, the intercalate in these GICs was sulfuric acid. The method comprises "contacting graphite flake with an organic expansion aid" [Claim 1 of Ref. 18]. It is speculated that the organic expansion aid (e.g., carboxylic acid), under the experimental conditions of Greinke, et al., resided on the exterior surface of graphite particles or between graphite particles. There was no indication that carboxylic acid, when used alone or as a portion of an intercalation solution in [Refs. 18-20], could penetrate and stay in graphite interstices to form a stable GIC. The organic expansion aid was used to increase the macroscopic expansion volume of a graphite sample, not for improving uniform expansion of individual flakes in a graphite particle, nor for enhancing the separation of exfoliated flakes. There was no attempt to apply this approach to exfoliation of other graphite structures than natural flake graphite. There was no attempt on submitting the exfoliated graphite to a mechanical shearing treatment for the purpose of producing NGPs.

By contrast, after intensive studies, we have observed that a significant amount of a wide range of carboxylic acids, not just formic acid, can be electrochemically intercalated into graphite to form stable graphite intercalation compounds (GICs). These GICs, when exposed to a temperature in the range of 300-800° C. (preferably in the range of 400-600° C.), were exfoliated in a relatively uniform manner. The resulting exfoliated flakes can be readily separated, via a mechanical shearing treatment, into individual nano-scaled graphene platelets (NGPs) that are relatively uniform in thickness. This was achieved without using an undesirable acid like sulfuric acid or undesirable oxidizing agent like nitric acid or potassium permanganate.

SUMMARY OF THE INVENTION

The present invention provides a method of producing nano-scaled graphene platelets with an average thickness smaller than 30 nm from a layered graphite material. The method comprises (a) forming a carboxylic acid-intercalated graphite compound by an electrochemical reaction which uses a carboxylic acid as both an electrolyte and an intercalate source, the layered graphite material as an anode material, and a metal or graphite as a cathode material, and wherein a current is imposed upon the cathode and the anode at a current density for a duration of time sufficient for effecting the electrochemical reaction; (b) exposing the intercalated graphite compound to a thermal shock to produce exfoliated graphite; and (c) subjecting the exfoliated graphite to a mechanical shearing treatment to produce the nano-scaled graphene platelets. The exfoliation step in the instant invention does not involve the evolution of undesirable species, such as $NO_x$ and $SO_x$, which are common by-products of exfoliating conventional sulfuric or nitric acid-intercalated graphite compounds.

The carboxylic acid may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_n COOH$, wherein n is a number of from 0 to 5, including formic, acetic, propionic, butyric, pentanoic, and hexanoic acids, anydrides thereof, reactive carboxylic acid derivatives thereof, and combinations thereof. The most preferred carboxylic acids are formic acid and acetic acid.

The layered graphite material may be selected from natural graphite, synthetic graphite, highly oriented pyrolytic graphite, graphite fiber, graphitic nano-fiber, graphite oxide, graphite fluoride, chemically modified graphite, or a combination thereof. The mechanical shearing treatment preferably comprises using air milling (including air jet milling), ball milling, mechanical shearing (including rotating blade fluid grinding), ultrasonication, or a combination thereof.

The imposing current used in the electrochemical reaction preferably provides a current density in the range of 20 to 600 $A/m^2$, more preferably in the range of 50 to 400 $A/m^2$, and most preferably in the range of 100 to 300 $A/m^2$. The exfoliation step preferably comprises heating the intercalated graphite to a temperature in the range of 300-800° C. for a duration of 10 seconds to 2 minutes, most preferably at a temperature in the range of 400-600° C. for a duration of 30-60 seconds.

Depending upon the nature of intercalate and the type of laminar graphite, the resulting NGPs, after one intercalation and exfoliation cycle, exhibit an average platelet thickness in the range of 10-30 nm. For a given graphite type and a carboxylic acid, the resulting NGPs have a relatively narrow distribution of thicknesses, as compared with NGPs prepared from conventional sulfuric acid-intercalated graphite exfoliated at a comparable temperature.

The method may comprise additional steps of electrochemical intercalation of the exfoliated graphite or subsequently separated nano-scaled graphene platelets to obtain a further intercalated compound, and exfoliation of the further intercalated compound to produce thinner nano-scaled graphene platelets, with or without another mechanical shearing treatment. Repeated intercalations and exfoliations result in the formation of ultra-thin NGPs with an average thickness no greater than 2 nm or 5 layers.

It may be noted that Viculis, et al [Ref. 10] did report that "graphite nanoplatelets with thickness down to 2-10 nm are synthesized by alkali metal intercalation followed by ethanol exfoliation and microwave drying." This was achieved by intercalating graphite with an oxidizing acid to form a graphite intercalation compound (GIC), exfoliating the GIC, re-intercalating the exfoliated graphite with an alkali metal to form a first-stage (Stage-1) compound, reacting the first-stage compound with ethanol to exfoliate the compound, and further separating the exfoliated graphite with microwave heating. That alkali metals react violently with water and alcohol implies that Visculis's method can not be a safe and reliable process for mass-producing NGPs. Furthermore, although re-intercalation and re-exfoliation were used in this process and first-stage graphite compound was obtained, the resulting graphite platelets are no thinner than 2 nm. Most of the platelets are thicker than 10-15 nm even after further exfoliation and separation via microwave heating (e.g., FIG. 5 of Ref. 10). Re-intercalation by liquid eutectic of sodium and potassium ($NaK_2$) and subsequent exfoliation yielded platelets with thicknesses of 2-150 nm (Page 976 of Ref. 10). It seems that violent reactions between intercalated alkali metals and water or ethanol tend to result in highly non-uniform exfoliation. Even with alkali metal-intercalated graphite being mostly Stage-1, the resulting platelets exhibit such a wide range of thicknesses (2-150 nm). By contrast, our invented method consistently produces platelets with an average thickness thinner than 2 nm or 5 layers after repeating electrochemical intercalation and exfoliation by only one cycle.

Although one of our co-pending applications [Ref. 16] provides a method that involves repeated intercalations and exfoliations, the intercalation was based on chemical oxidation (e.g., sulfuric acid and an oxidizing agent), rather than electrochemical intercalation. Furthermore, in the present invention, if the NGPs or exfoliated flakes have an average thickness smaller than 30 nm (as opposed to 10 nm in the co-pending application case), the electrochemically re-intercalated compound consistently led to the formation of ultra-thin NGPs. This is a surprising result beyond and above what is anticipated by the co-pending application [Ref. 16].

BRIEF DESCRIPTION OF THE DRAWINGS

FIG. 4 Platelet thickness distributions for NGPs prepared from sulfuric-nitric acid-intercalated graphite according to a prior art method and those for the NGPs prepared from formic-acid intercalated graphite according to the presently invented method.

DETAILED DESCRIPTION OF PREFERRED EMBODIMENTS

Figure 1:
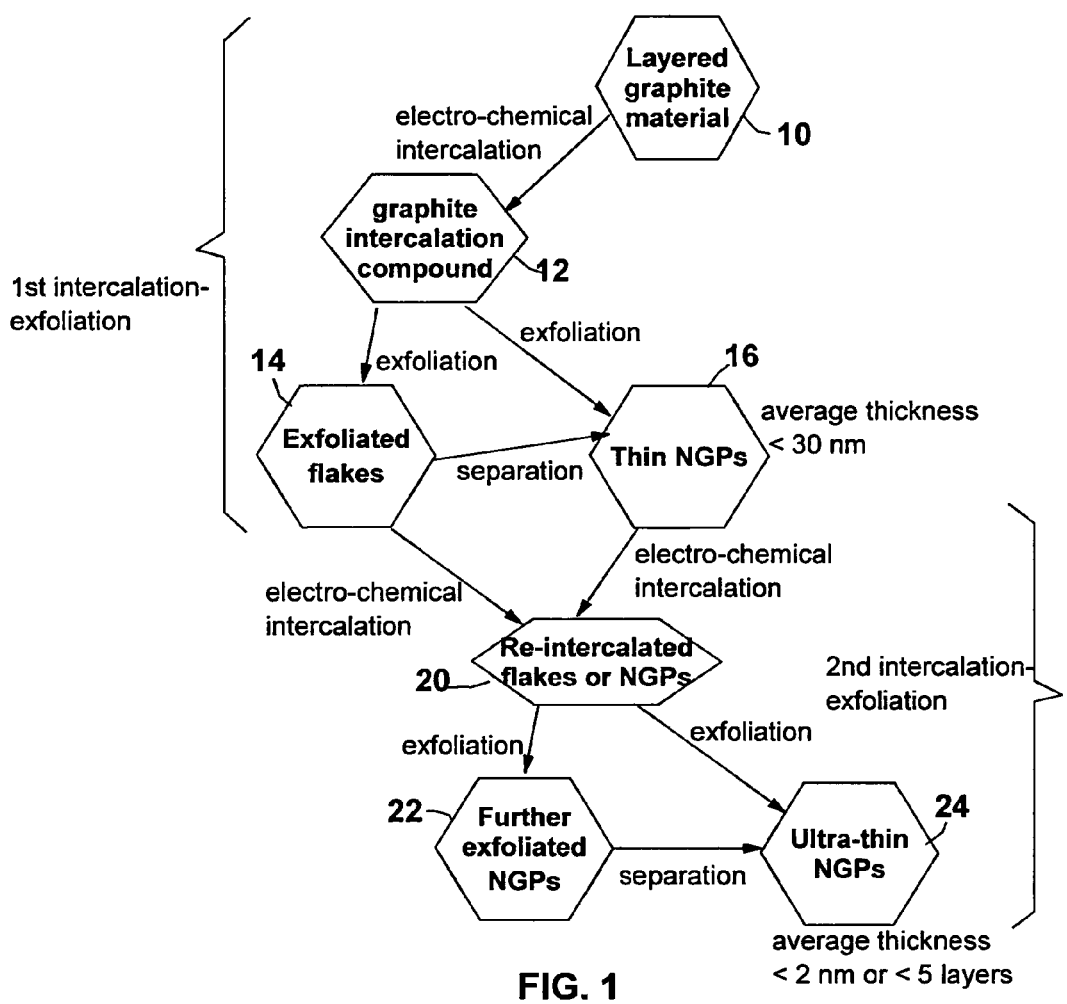
FIG. 1 A flow chart showing a two-stage process of producing ultra-thin graphite platelets (NGPs with an average thickness thinner than 2 nm or 5 layers). Both steps entail an electrochemical intercalation step.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In the case of a carbon or graphite fiber segment, the graphene plates may be a part of a characteristic "turbostratic structure."

One preferred specific embodiment of the present invention is a method of producing a nano-scaled graphene plate (NGP) material that is essentially composed of a sheet of graphene plane or multiple sheets of graphene plane stacked and bonded together (on an average, up to five sheets per plate). Each graphene plane, also referred to as a graphene sheet or basal plane, comprises a two-dimensional hexagonal structure of carbon atoms. Each plate has a length and a width parallel to the graphite plane and a thickness orthogonal to the graphite plane. By definition, the thickness of an NGP is 100 nanometers (nm) or smaller, with a single-sheet NGP being as thin as 0.34 nm. The length and width of a NGP are typically between 1:m and 20 Φm, but could be longer or shorter. For certain applications, both length and width are smaller than 1 μm. In addition to graphite, graphite oxide and graphite fluoride are another two of the many examples of laminar or layered materials that can be exfoliated to become nano-scaled platelets.

Generally speaking, a method has been developed for converting a layered or laminar graphite material 10 to nano-scaled graphite platelets having an average thickness smaller than 30 nm, most often smaller than 10 nm. As schematically shown in the upper portion of FIG. 1, the method comprises (a) forming a carboxylic acid-intercalated graphite compound 12 by an electrochemical reaction which uses a carboxylic acid as both an electrolyte and an intercalate source, the layered graphite material as an anode material, and a metal or graphite as a cathode material, and wherein a current is imposed upon the cathode and the anode at a current density for a duration of time sufficient for effecting the electrochemical reaction; (b) exposing the intercalated graphite compound 12 to a thermal shock to produce exfoliated graphite 14; and (c) subjecting the exfoliated graphite to a mechanical shearing treatment to produce the desired nano-scaled graphene platelets 16. The exfoliation step preferably comprises heating the intercalated graphite to a temperature in the range of 300-800° C. for a duration of 10 seconds to 2 minutes, most preferably at a temperature in the range of 400-600° C. for a duration of 30-60 seconds. The exfoliation step in the instant invention does not involve the evolution of undesirable species, such as $NO_x$ and $SO_x$, which are common by-products of exfoliating conventional sulfuric or nitric acid-intercalated graphite compounds.

Figure 2:
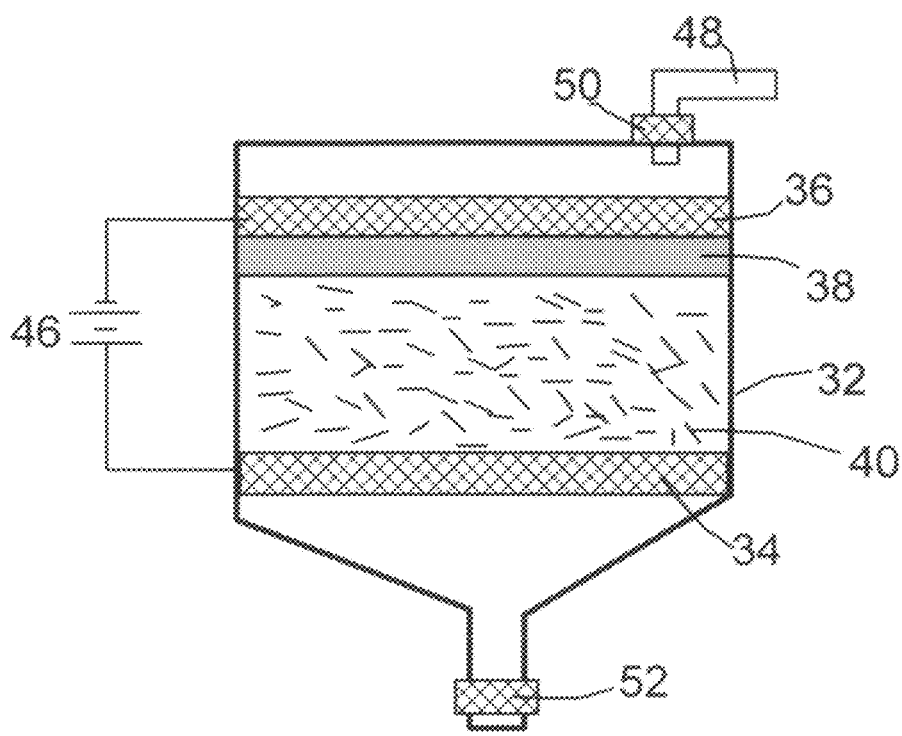
FIG. 2 Schematic of an apparatus for electrochemical intercalation of graphite.

Schematically shown in FIG. 2 is an apparatus that can be used for electrochemical intercalation of graphite according to a preferred embodiment of the present invention. The apparatus comprises a container 32 to accommodate electrodes and electrolyte. The anode is comprised of multiple graphite particles 40 that are dispersed in an electrolyte (e.g., a carboxylic acid, which is also an intercalate) and are supported by a porous anode supporting element 34, preferably a porous metal plate, such as platinum or lead. The graphite particles 40 preferably form a continuous electron path with respect to the anode support plate 34, but are accessible to the intercalate. An electrically insulating, porous separator plate 38 (e.g., Teflon fabric or glass fiber mat) is placed between the anode and the cathode 36 (e.g., a porous graphite or metal plate) to prevent internal short-circuiting. A DC current source 46 is used to provide a current to the anode support element 34 and the cathode 36. The imposing current used in the electrochemical reaction preferably provides a current density in the range of 50 to 600 A/m$^2$, most preferably in the range of 100 to 400 A/m$^2$. Fresh electrolyte (intercalate) may be supplied from an electrolyte source (not shown) through a pipe 48 and a control valve 50. Excess electrolyte may be drained through a valve 52.

The carboxylic acid, containing only C, H, and O atoms, may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_n COOH$, wherein n is a number of from 0 to 5, including formic, acetic, propionic, butyric, pentanoic, and hexanoic acids, anydrides thereof, reactive carboxylic acid derivatives thereof, and combinations thereof. In place of the carboxylic acids, the anhydrides or reactive carboxylic acid derivatives such as alkyl esters can also be employed. Representative of alkyl esters are methyl formate and ethyl formate. The most preferred carboxylic acids are formic acid and acetic acid.

Representative of dicarboxylic acids are aliphatic dicarboxylic acids having 2-12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate.

Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Among the polycarboxylic acids, citric acid is preferred due to its availability and low cost.

The carboxylic acid-intercalated graphite can be easily exfoliated by rapidly heating the GIC to a desired exfoliation temperature. An advantage of such a GIC in comparison with the prior art GICs is that only H, C and O are released into the atmosphere during the exfoliation process. Depending on the applied current density and the reaction time, an expansion volume of from 100-300 ml/g, at 400-800° C., and volatile content of 10-20 wt %, could be obtained. The residual sulfur content in the expanded graphite is no more than the sulfur impurity level of the original graphite flakes since the process is totally sulfur free, as opposed to more than 1,000 ppm of sulfur typically found in conventional exfoliated graphite manufactured from a sulfuric acid-intercalated GIC. Furthermore, the exfoliated graphite and subsequent NGPs do not contain additional corrosive species such as chlorine, fluorine, nitrogen, and phosphor.

The layered graphite material may be selected from natural graphite, synthetic graphite, highly oriented pyrolytic graphite, graphite fiber, graphitic nano-fiber, graphite oxide, graphite fluoride, chemically modified graphite, graphite intercalation compound, exfoliated graphite, or a combination thereof.

The mechanical shearing treatment, used to further separate graphite flakes and possibly reduce the flake size, preferably comprises using air milling (including air jet milling), ball milling, mechanical shearing (including rotating blade fluid grinding), any fluid energy based size-reduction process, ultrasonication, or a combination thereof.

We have found that the invented electrochemical intercalation and thermal exfoliation mostly led to the formation of NGPs with an average thickness smaller than 10 nm. However, intercalation with higher-order aliphatic carboxylic acids of the formula $H(CH_2)_n COOH$ with n greater than 2 (i.e., butyric, pentanoic, and hexanoic acids) or with dicarboxylic acids and polycarboxylic acids could lead to the formation of NGPs with an average thickness greater than 10 nm, but smaller than 30 nm. In order to further reduce the platelet thickness, we have conducted further studies and found that repeated electrochemical intercalations/exfoliations are an effective method of producing ultra-thin, nano-scaled graphene platelets with an average thickness smaller than 2 nm or 5 graphene sheets.

Hence, another preferred embodiment is a method of producing ultra-thin NGPs with the method comprising: (a) forming a carboxylic acid-intercalated graphite compound by an electrochemical reaction which uses a carboxylic acid as both an electrolyte and an intercalate source, said layered graphite material as an anode material, and a metal or graphite as a cathode material, and wherein a current is imposed upon the cathode and the anode at a current density for a duration of time sufficient for effecting the electrochemical reaction; (b) exposing the intercalated graphite compound to a thermal shock to produce exfoliated graphite; (c) re-intercalating the exfoliated graphite by repeating step (a) using the exfoliated graphite (with or without a mechanical shearing treatment) as an anode material to produce a further-intercalated graphite compound; and (d) exposing the further intercalated graphite compound to a thermal shock to produce the desired ultra-thin, nano-scaled graphene platelets. Step (d) may further comprise a sub-step of subjecting the thermal shock exposed graphite to a mechanical shearing treatment to further separate or size-reduce the platelets.

Figure 3A:
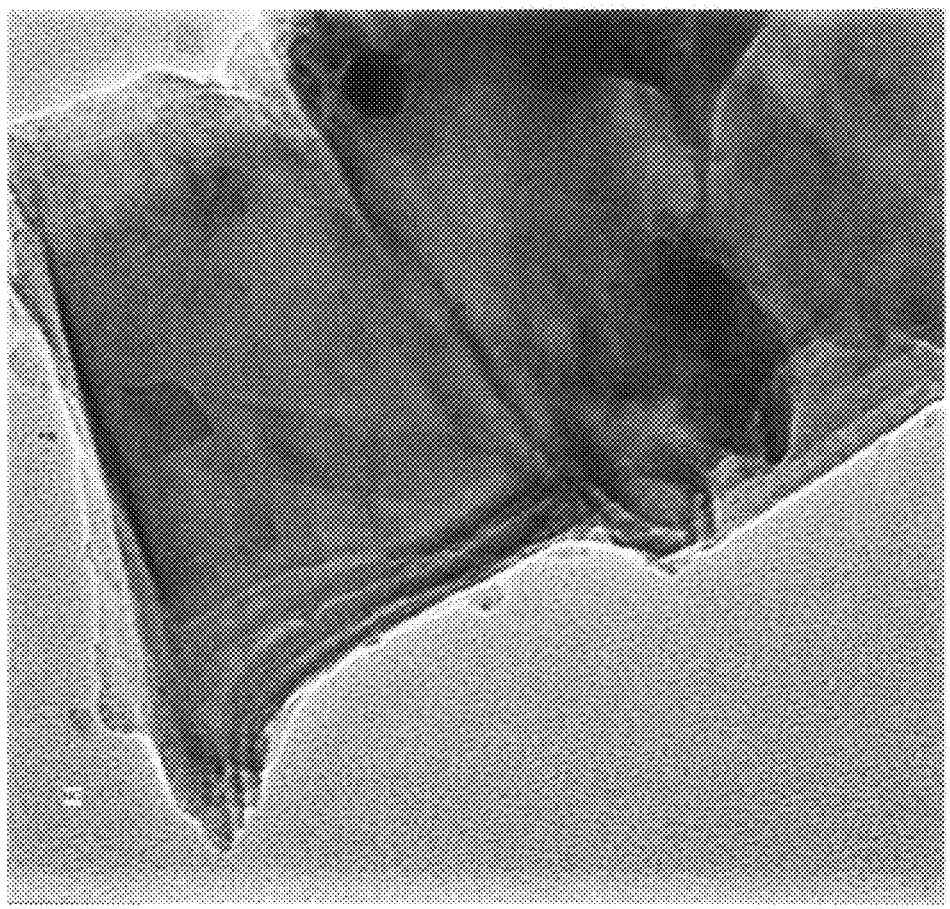
FIG. 3 Transmission electron micrographs of NGPs: (A) NGP with an average thickness <30 nm (at the end of Phase I); (B) ultra-thin NGPs (Phase II).
Figure 3B:
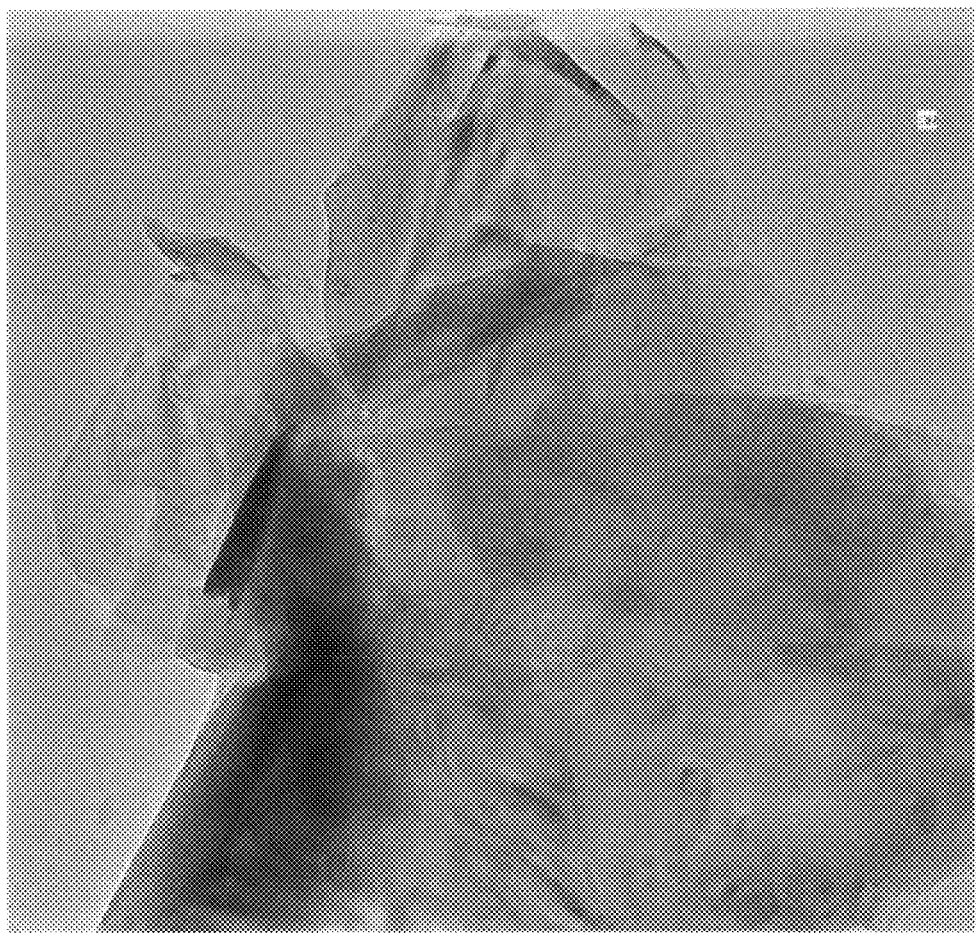

In summary, the method may be described as having two primary phases, schematically shown in FIG. 1. Phase I essentially entails converting a laminar graphite material to exfoliated graphite flakes 14 or NGPs 16 of intermediate thicknesses (typically, on an average, thinner than 30 nm; e.g., FIG. 3(A)). In one preferred embodiment of the present invention, Phase II entails essentially repeating Phase I to further reduce the average platelet thickness by re-intercalating the exfoliated flakes 14 or NGPs 16 to obtain re-intercalated compound 20, exfoliating the re-intercalated compound to either directly produce ultra-thin NGPs 24 or produce further exfoliated NGPs 22, which are then subjected to a mechanical shearing treatment to obtain ultra-thin NGPs 24 (e.g., FIG. 3(B)).

After extensive and in-depth studies on the preparation of NGPs, we have surprisingly observed that the NGPs, after first cycle of electro-chemical intercalation and thermal exfoliation, exhibit an average thickness thinner than 30 nm (thinner than 10 nm if formic acid or acetic acid was used). These NGPs of intermediate thicknesses (e.g., thinner than 30 nm), upon repeated electrochemical intercalation and thermal exfoliation for another cycle, led to the formation of ultra-thin NGPs. The re-intercalation/exfoliation procedures or conditions used in Phase II are fundamentally no different than those used in Phase I.

It may be noted that, in a traditional GIC obtained by intercalation of a laminar graphite material, the intercalant species may form a complete or partial layer in an inter-layer space or gallery. If there always exists one graphene layer between two intercalant layers, the resulting graphite is referred to as a Stage-1 GIC. If n graphene layers exist between two intercalant layers, we have a Stage-n GIC. Carboxylic acid-intercalated graphite compounds were found to be stage-2, stage-3, stage-4, or stage-5, depending on the type of carboxylic acid used. It is generally believed that a necessary condition for the formation of all single-sheet NGPs is to have a perfect Stage-1 GIC for exfoliation. Even with a Stage-1 GIC, not all of the graphene layers get exfoliated for reasons that remain unclear. Similarly, exfoliation of a Stage-n GIC (with n>5) tends to lead to a wide distribution of NGP thicknesses (mostly much greater than n layers). In other words, exfoliation of Stage-5 GICs often yields NGPs much thicker than 10 or 20 layers. Hence, a major challenge is to be able to consistently produce NGPs with well-controlled dimensions (preferably ultra-thin) from acid-intercalated graphite.

In this context, it was surprising for us to discover that, once the starting NGPs are thinner than 10 nm, re-intercalation by chemical oxidation tends to lead to mostly Stage-1 and Stage-2 GICs, as indicated in a co-pending application [Ref. 16]. It is further surprising that NGPs or flakes with an average thickness thinner than 30 nm, upon electrochemical intercalation with a carboxylic acid and thermal exfoliation for another cycle, become ultra-thin NGPs. Many of these NGPs are single-sheet or double-sheet NGPs, with very few NGPs thicker than 5 layers. Thus, one can conclude that re-intercalation/exfoliation is an effective, consistent way of producing ultra-thin NGPs with an average thickness less than 2 nm (or 5 layers), usually less than 1 nm. We have further observed that repeated intercalations and exfoliations can be performed to obtain mostly single-sheet NGPs. Now, one can consistently produce single-sheet NGPs for a wide range of industrial uses.

The following examples serve to provide the best modes of practice for the present invention and should not be construed as limiting the scope of the invention:

Example 1

Nano-scaled graphene platelets (NGPs) from highly oriented pyrolytic graphite (HOPG) flakes via repeated electrochemical intercalation and exfoliation steps.

One gram of HOPG flakes, ground to approximately 20 μm or less in sizes, were used as the anode material and 1,000 mL of formic acid was used as the electrolyte and intercalate source. The anode supporting element is a platinum plate and the cathode is a graphite plate of approximately 4 cm in diameter and 0.2 cm in thickness. The separator, a glass fiber fabric, was used to separate the cathode plate from the graphite flakes and to compress the graphite flakes down against the anode supporting element to ensure that the graphite flakes are in electrical connection with the anode supporting element to serve as the anode. The electrodes, electrolyte, and separator are contained in a Buchner-type funnel to form an electrochemical cell. The anode supporting element, the cathode, and the separator are porous to permit intercalate (electrolyte) to saturate the graphite and to pass through the cell from top to bottom.

The graphite flakes were subjected to an electrolytic oxidation treatment at a current of 0.5 amps (current density of about 0.04 amps/cm$^2$) and at a cell voltage of about 4-6 volts for 2-5 hours. These values may be varied with changes in cell configuration and makeup. Following electrolytic treatment, the resulting intercalated flake was washed with water and dried.

Subsequently, approximately ⅔ of the intercalated compound was transferred to a furnace pre-set at a temperature of 600° C. for 30 seconds. The compound was found to induce extremely rapid and high expansions of graphite crystallites with an expansion ratio of greater than 200. The thickness of individual platelets ranged from two graphene sheets to approximately 43 graphene sheets (average of 23 sheets or approximately 7.9 nm) based on SEM and TEM observations.

Approximately one half of these NGPs were then subjected to re-intercalation under comparable electrolytic oxidation conditions to obtain re-intercalated NGPs. Subsequently, these re-intercalated NGPs were transferred to a furnace pre-set at a temperature of 600° C. for 30 seconds to produce ultra-thin NGPs. Electron microscopic examinations of selected samples indicate that the majority of the resulting NGPs contain between single graphene sheet and five sheets.

Comparative Example 1

Sulfuric-Nitric Acid-Intercalated HOPG

One gram of HOPG flakes as used in Example 1 were intercalated with a mixture of sulfuric acid, nitric acid, and potassium permanganate at a weight ratio of 4:1:0.05 (graphite-to-intercalate ratio of 1:3) for four hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exfoliated at 800° C. for 45 seconds. A sample of formic acid-intercalated graphite prepared in Example 1 was also exfoliated at 800° C. for 45 seconds. Both samples were separately submitted to a mechanical shearing treatment using a Cowles rotating blade device for 30 minutes. The resulting NGPs were examined using SEM and TEM and their thickness distributions are shown in FIG. 4. It is clear that the formic acid-intercalated graphite led to a narrower thickness distribution (more uniform size) and a smaller average thickness.

Example 2

NGPs from Natural Graphite Flakes Intercalated with Acetic Acid

One gram of natural flake graphite having 50 mesh particle size was subjected to the same electrochemical intercalation conditions described in Example 1, with formic acid replaced by acetic acid. The graphite flakes were subjected to an electrolytic oxidation treatment at a current of 0.5 amps (current density of about 0.04 amps/cm$^2$) and at a cell voltage of about 6 volts for 3 hours. Following the electrolytic treatment, the resulting intercalated flake was washed with water and dried. Subsequently, the intercalated compound was transferred to a furnace pre-set at a temperature of 500° C. for 45 seconds. The compound was found to induce extremely rapid and high expansions of graphite crystallites with an expansion ratio of greater than 100. After a mechanical shearing treatment in a laboratory-scale Cowles rotating blade device for 15 minutes, the resulting NGPs exhibit a thickness ranging from three graphene sheets to approximately 50 graphene sheets (average of 25 sheets or approximately 8.5 nm) based on SEM and TEM observations. Re-intercalation of these NGPs and subsequent exfoliation resulted in further reduction in platelet thickness, with an average thickness of approximately 1.4 nm.

Example 3

Repeated Interaction, Exfoliation, and Separation Steps of Graphite Oxide

Graphite oxide was prepared by oxidation of graphite flakes with sulfuric acid, nitrate, and potassium permanganate according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 Å), indicating that graphite has been converted into graphite oxide.

The dried intercalated graphite oxide powder sample was then subjected to an electrochemical intercalation under comparable conditions as described in Example 1, but with formic acid replaced by propionic acid as the intercalate. The dried, intercalated compound was placed in a quartz tube and inserted into a horizontal tube furnace pre-set at 650° C. for 35 seconds. The exfoliated worms were mixed with water and then subjected to a mechanical shearing treatment using a Cowles rotating-blade shearing machine for 20 minutes. The resulting flakes (intermediate-thickness platelets) were found to have a thickness of 12.6 nm.

These intermediate-thickness platelets were then re-intercalated electrochemically under comparable conditions. The dried powder sample was placed in a quartz tube and inserted into a horizontal tube furnace pre-set at 800° C. for 35 seconds. The resulting ultra-thin graphite oxide platelets have an average thickness of approximately 1.8 nm.

Example 4

NGPs from Short Carbon Fiber Segments

The procedure was similar to that used in Example 1, but the starting material was graphite fibers chopped into segments with 0.2 mm or smaller in length prior to electrochemical intercalation by citric acid. The diameter of carbon fibers was approximately 12 μm. After intercalation and exfoliation at 600° C. for 30 seconds, the platelets exhibit an average thickness of 18 nm. Electrochemical re-intercalation of these intermediate-thickness NGPs with formic acid and subsequent exfoliation of the dried re-intercalation compound resulted in the formation of ultra-thin NGPs with an average thickness of 1.7 nm.

Example 5

NGPs from Carbon Nano-Fibers (CNFs)

A powder sample of carbon nano-fibers was supplied from Applied Science, Inc. (ASI), Cedarville, Ohio. Approximately 1 gram of CNFs was subjected to repeated electrochemical intercalations and exfoliations under conditions similar to those used in Example 1. Ultra-thin NGPs with an average thickness of 1.5 nm were obtained.

It is important to emphasize again the notion that, although Kang, et al [Ref. 7] used an electrochemical method to intercalate natural flake graphite with formic acid, there was no indication, implicit or explicit, that any other member of the carboxylic acid family or any member of their anhydrides and their derivatives could be successfully intercalated into interstices of graphite. This is not a trivial or obvious matter due to the fact that formic acid with a chemical formula HCOOH is the smallest molecule in the family of carboxylic acids. Other members are much bigger molecules. Yet, the interstitial spaces between two basal planes are only approximately 0.28 nm (the plane-to-plane distance is 0.34 nm). A skilled person in the art would predict that larger carboxylic acid molecules can not intercalate into interstitial spaces of a layered graphite material. After intensive R&D efforts, we found that electrochemical methods with a proper combination of an intercalate and an imposing current density could be used to open up the interstitial spaces to accommodate much larger carboxylic acid molecules than formic acid.

Furthermore, Kang, et al. did not indicate that any of the carboxylic acid, formic acid or larger-molecule acids, can be intercalated into other layered graphite structures (such as graphite fibers, carbon nano-fibers, synthetic graphite, or highly pyrolytic graphite flakes) than natural flake graphite. There was no indication that the formic acid-intercalated graphite could lead to well-separated, nano-scaled graphene platelets (NGPs), let alone NGPs of uniform sizes or ultra-thinness (e.g., thinner than 2 nm).

The invention claimed is:

1. A method of producing nano-scaled graphene platelets with an average thickness smaller than 30 nm from a layered graphite material, said method comprising:
   a) forming a carboxylic acid-intercalated graphite compound by an electrochemical reaction which uses a carboxylic acid as both an electrolyte and an intercalate source, said layered graphite material as an anode material, and a metal or graphite as a cathode material, and wherein a current is imposed upon said cathode and said anode at a current density for a duration of time sufficient for effecting said electrochemical reaction, wherein said carboxylic acid is selected from the group consisting of propionic, butyric, pentanoic, hexanoic acids, anhydrides thereof, and combinations thereof;
   b) exposing said carboxylic acid-intercalated graphite compound to a thermal shock to form exfoliated graphite; and
   c) subjecting said exfoliated graphite to a mechanical shearing treatment to produce said nano-scaled graphene platelets.

2. The method of claim 1 wherein said layered graphite material is selected from natural graphite, synthetic graphite, highly oriented pyrolytic graphite, graphite fiber, graphitic nano-fiber, graphite oxide, graphite fluoride, chemically modified graphite, graphite intercalation compound, exfoliated graphite, or a combination thereof.

3. The method of claim 1 wherein said mechanical shearing treatment comprises using air milling, airjet milling, ball milling, rotating-blade mechanical shearing, ultrasonication, or a combination thereof.

4. The method of claim 1 wherein the imposing current provides a current density in the range of 50 to 600 A/m$^2$.

5. The method of claim 1 wherein said step of exposing comprises heating said carboxylic acid-intercalated graphite to a temperature in the range of 300-800° C. for a period of 15 seconds to 2 minutes.

6. The method of claim 1 wherein said mechanical shearing treatment comprises operating an air mill or air jet mill at a desired air velocity sufficient for breaking up flakes of exfoliated graphite.

7. The method of claim 1, further comprising additional steps of electrochemically intercalating said nano-scaled graphene platelets to obtain a further intercalated compound and exfoliating said further intercalated compound to produce thinner nano-scaled graphene platelets.

8. The method of claim 1 wherein the imposing current provides a current density in the range of 100 to 400 A/m$^2$.

* * * * *